(12) United States Patent
Momen

(10) Patent No.: US 10,029,490 B2
(45) Date of Patent: Jul. 24, 2018

(54) PAPER POSITION DETECTOR FOR DETECTING A POSITION OF PAPER CARRIED ALONG A PAPER FEEDING DIRECTION USING A GRAPHIC SHAPE ON THE PAPER

(71) Applicant: RISO KAGAKU CORPORATION, Tokyo (JP)

(72) Inventor: Jiro Momen, Tukuba (JP)

(73) Assignee: RISO KAGAKU CORPORATION, Tokyo (JP)

( * ) Notice: Subject to any disclaimer, the term of this patent is extended or adjusted under 35 U.S.C. 154(b) by 154 days.

(21) Appl. No.: 14/918,761

(22) Filed: Oct. 21, 2015

(65) Prior Publication Data
US 2016/0114603 A1   Apr. 28, 2016

(30) Foreign Application Priority Data
Oct. 23, 2014   (JP) .................................. 2014-216470

(51) Int. Cl.
*B41J 11/46*   (2006.01)
*G03G 15/00*   (2006.01)
(Continued)

(52) U.S. Cl.
CPC ............ *B41J 11/46* (2013.01); *B41J 11/0095* (2013.01); *G03G 15/5062* (2013.01); *H04N 1/00702* (2013.01)

(58) Field of Classification Search
CPC ...... G01B 11/24; G01B 11/26; B41J 11/0095; B41J 11/46; B41J 13/0009; B41J 11/008;
(Continued)

(56) References Cited

U.S. PATENT DOCUMENTS 6,118,463 A * 9/2000 Houki .................... H04N 1/506
                                              347/116
6,317,147 B1 * 11/2001 Tanaka ................... H04N 1/506
                                              347/116
(Continued)

FOREIGN PATENT DOCUMENTS

JP    2003-063072 A    3/2003

OTHER PUBLICATIONS

Europe Patent Office, "Search Reprot for European Patent Application No. 15190747.4," dated Apr. 7, 2016.

*Primary Examiner* — Que T Le
*Assistant Examiner* — Jennifer Bennett
(74) *Attorney, Agent, or Firm* — Manabu Kanesaka

(57) ABSTRACT

Paper has a detection pattern having a length in a main scanning direction, the length becoming shorter from upstream to downstream along a paper feeding direction. An image sensor detects the detection pattern and outputs a detection signal including data in the main scanning direction (length y). A control unit calculates a position of a vertex of the detection pattern, by using the detection signal, a feeding speed, an angle being half of the vertex angle of the pattern, and an imaging time, so as to correct an image forming position on the back side to coincide with an image on the front side. The detection signal from the sensor with a low operation speed is processed according to a method utilizing a shape feature and the like of the detection pattern, thereby precisely detecting the position of the paper in the feeding direction.

1 Claim, 8 Drawing Sheets

$x = v \cdot t - y'/\tan\theta$ x : DISTANCE FROM START OF IMAGING TO TIP OF MARK v : FEEDING SPEED t : IMAGING TIME y' : DETECTED WIDTH OF MARK ( REGION OF VERTICAL STRIPES) IN MAIN SCANNING DIRECTION

θ : SUB SCANNING SLOPE OF MARK

(51) Int. Cl.
*H04N 1/00* (2006.01)
*B41J 11/00* (2006.01)

(58) Field of Classification Search
CPC ...... G01D 5/34; G01D 5/341; G03G 15/5058; G03G 15/5054; G03G 2215/00569; G03G 15/5062; G03G 15/238; G03G 2215/00586; G03G 2215/00561; G03G 2215/00459; H04N 1/00702
See application file for complete search history.

(56) References Cited

U.S. PATENT DOCUMENTS

| | | | | |
|---|---|---|---|---|
| 7,583,282 | B2* | 9/2009 | Yamauchi | G03G 15/5062 347/229 |
| 2010/0243697 | A1* | 9/2010 | Aoki | B41J 11/46 226/9 |
| 2012/0014703 | A1 | 1/2012 | Karasawa | |

* cited by examiner

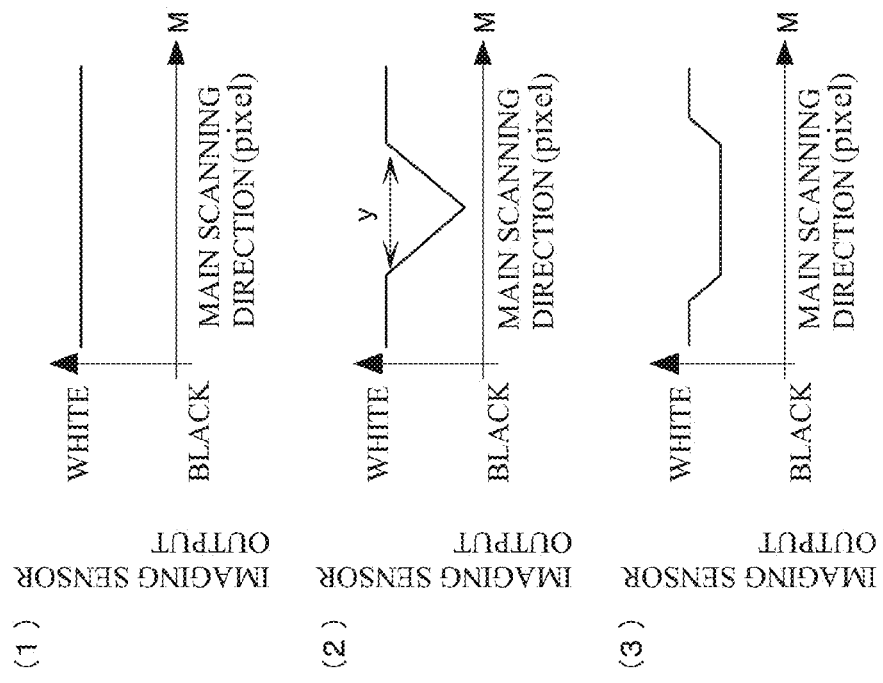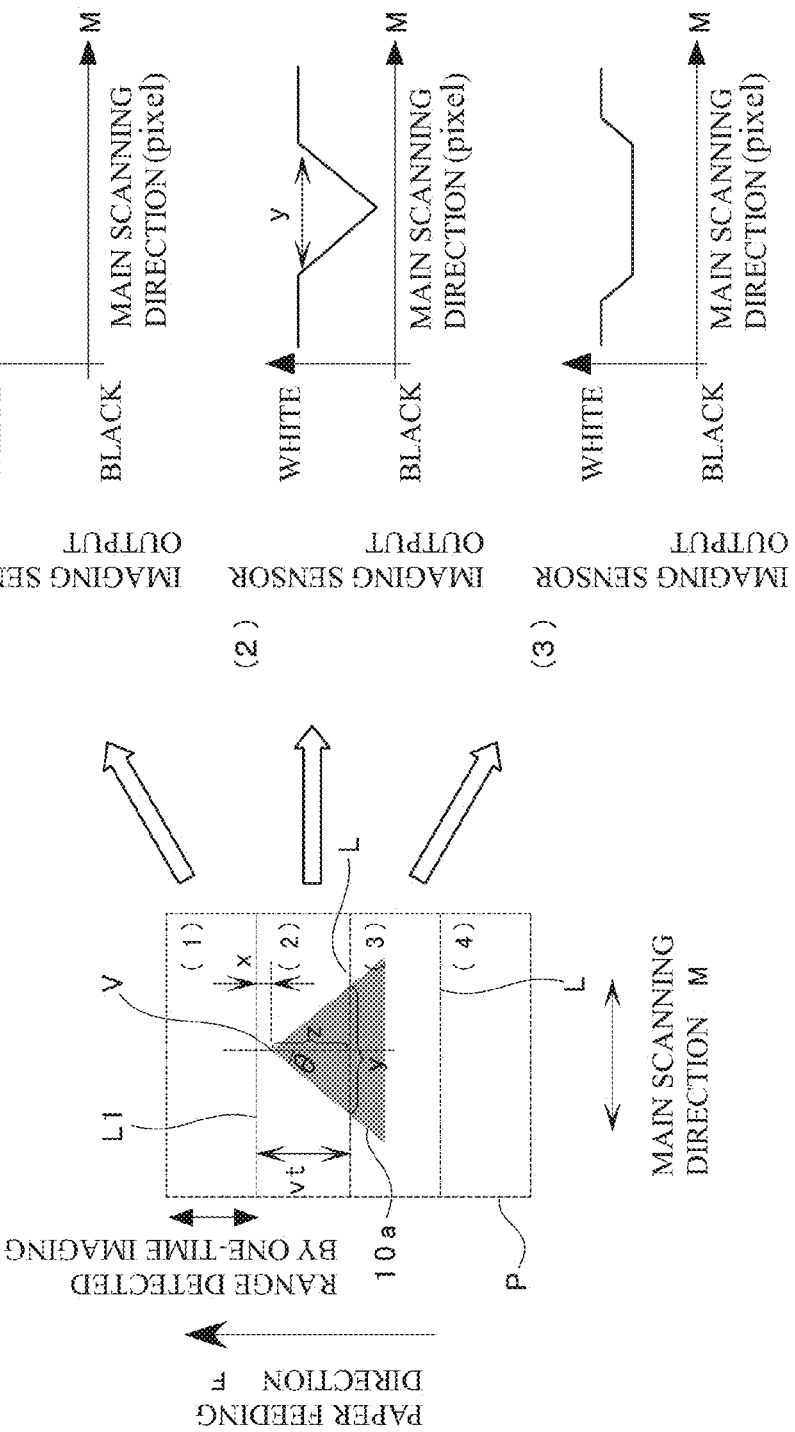

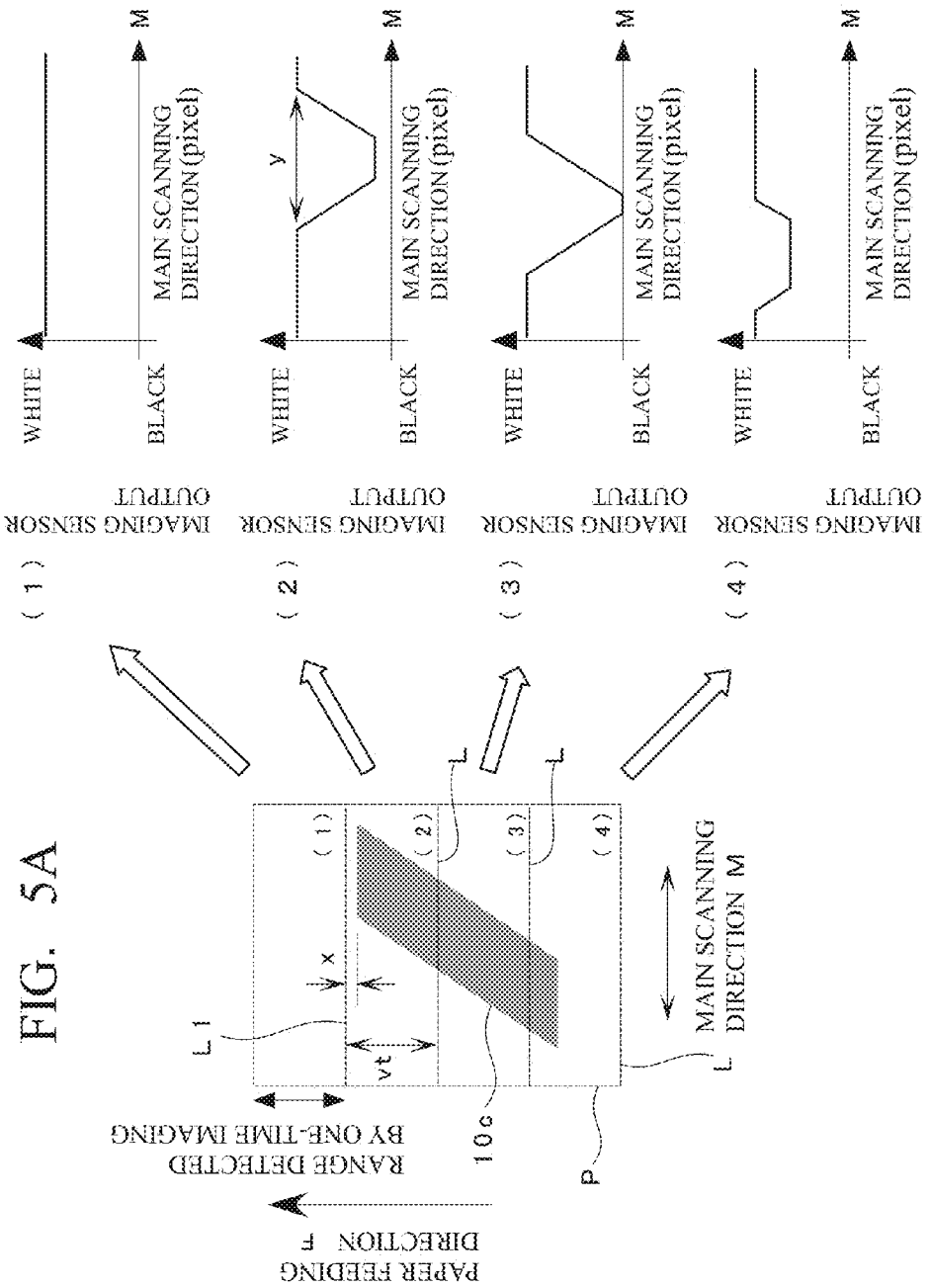

$y' = y - y_t$ y : OBTAINABLE BY SENSOR
    (MEASURED VALUE)
$y_t$ : LENGTH OF SIDE OF
    PARALLELOGRAM
    (ALREADY-KNOWN)

$x = v \cdot t - y'/\tan \theta$ x : DISTANCE FROM START OF IMAGING TO TIP OF MARK v : FEEDING SPEED t : IMAGING TIME y' : DETECTED WIDTH OF MARK (REGION OF VERTICAL STRIPES) IN MAIN SCANNING DIRECTION

θ : SUB SCANNING SLOPE OF MARK

PAPER POSITION DETECTOR FOR DETECTING A POSITION OF PAPER CARRIED ALONG A PAPER FEEDING DIRECTION USING A GRAPHIC SHAPE ON THE PAPER

RELATED APPLICATIONS

The present application claims priority from Japanese Application No. 2014-216470, filed Oct. 23, 2014, the disclosure of which is hereby incorporated by reference herein in its entirety.

TECHNICAL FIELD

The present invention relates to a paper position detector configured to determine a position of paper by detecting a detection pattern formed on the paper being carried, and more particularly, to a paper position detector that uses a detection pattern in a contrived shape and the like allowing a position of the detection pattern to be determined at high resolution and detect a position of the paper precisely, even when a sensor relatively low in operating speed is employed.

BACKGROUND OF ART

Japanese Unexamined Patent Application Publication No. 2003-63072 discloses an invention including a duplex printer that prints a mark for alignment on a margin of roll paper, and performs alignment for printing on both sides, on the basis of this mark. According to the descriptions of the patent literature, the duplex printer that performs printing on both sides of a long continuous sheet, typically using two printers respectively, errors in paper feeding precision may be accumulated after continuous long-term printing, and this may cause positional discrepancies between the image printed on the front side and the image to be printed on the back side. In order to solve this problem, the patent literature also describes that as shown in FIG. 4A of the patent literature, according to the invention, the first printer provides marks 93 invisible to naked eyes at regular distances on the front side of printing paper, whereas as shown in FIG. 4B, the second printer reads the mark 93, finding a print start position on the basis of the mark position, and executes printing on the back side of the printing paper, thereby eliminating the discrepancies between the first and the second printers due to accumulation of precision errors in paper feeding. It is also described here that in the second printer, the sensor 100 reads the mark 93, but it is alternatively possible to provide a sensor such as a photoreflector as a paper end detection unit instead of the sensor 100 so as to detect the end of the printing paper.

SUMMARY OF INVENTION

Technical Problem

By way of example, a typical conventional image forming apparatus such as an ink jet printer (IJ printer) having an ink-jet head as an image forming unit, may be provided with an image sensor for detecting misregistration of paper with respect to a width direction (referred to as a main scanning direction) of the paper, being orthogonal to a paper feeding direction, the image sensor having a size that covers full width of the main scanning direction. In general, such image sensor used for image forming alignment in the main scanning direction has a configuration that a large number of imaging elements, for instance, thousands of imaging elements such as CCDs or CMOS, are arranged in parallel with the main scanning direction, and all the imaging elements are operated at once for the paper being carried at a predetermined feeding speed, thereby acquiring image information as to every specific range of the paper being carried during this operating time.

This kind of image sensor has a simple configuration that serially outputs image signals transferred respectively from the large number of imaging elements, and it is widely employed in an image forming apparatus. However, there is a problem that it takes a long time to process the image information. It is also conceivable to establish connection with an external device so that signals are outputted in parallel from the large number of imaging elements, thereby improving the operating speed. However, this may result in losing an advantage of being inexpensive, and thus such high-cost structure cannot be employed as a sensor used for the image forming alignment in the main scanning direction of the paper while it is being carried.

In the duplex printer of the invention as described in the aforementioned Patent Literature 1, this kind of image sensor is already provided for the detection in the main scanning direction, and if this sensor can also be utilized as a second printer to read a mark attached on the printing paper, it is not necessary to newly provide a dedicated sensor separately, and system simplification and lower cost are likely to be achieved.

However, according to the duplex printer of the invention as disclosed in the aforementioned Patent Literature 1, if the printing paper is carried at a high speed, the sensor provided in the second printer for reading the mark attached on the printing paper by the first printer is required to have a function of high-speed reading. However, since the aforementioned image sensor has a configuration to output the image signals serially from the large number of imaging elements, as described above, it is difficult to use the image sensor as a sensor that is operable at high speed for detecting the position of the paper precisely, with respect to the paper feeding direction.

The present invention has been made in view of the conventional technique and problems thereof, and an object of the present invention is to provide a paper position detector configured to detect a detection pattern formed on the paper being carried and determine a position of the paper, and even when a sensor with relatively low operation speed is employed, the paper position detector is able to detect the paper position precisely by processing detection signals from the sensor according to an algorithm utilizing a shape feature and the like of the detection pattern, and then, allowing the paper position to be detected precisely.

Solution to Problem

In a first aspect of the invention, the paper position detector is configured to detect a position of paper that is carried along a predetermined paper feeding direction, being provided with a detection unit configured to detect, on the paper, a detection pattern including a graphic shape having a length in the main scanning direction orthogonal to the paper feeding direction, the length becoming shorter from upstream to downstream along the paper feeding direction, and output a detection signal including at least data in the main scanning direction, and a control unit configured to use at least the detection signal outputted from the detection unit and calculate a position of a part of the detection pattern on the downmost stream side in the paper feeding direction.

In a second aspect of the invention, the control unit in the paper position detector of the first aspect calculates the position of the part of the detection pattern, by using data in the main scanning direction included in the detection signal outputted from the detection unit, a paper feeding speed, time taken for the detection unit to detect the detection pattern, and data as to a shape of the detection pattern.

Advantageous Effects of Invention

According to the paper position detector of the first aspect of the invention, the detection unit detects a detection pattern on the paper being carried at a predetermined feeding speed, and outputs a detection signal. This detection pattern is a graphic shape having a length in a width direction of the paper, i.e., the length in the main scanning direction of the paper, becoming shorter from upstream to downstream along the paper feeding direction, or a shape containing such graphical shape. While the detection unit detects the detection pattern, the paper is being carried at a predetermined feeding speed. Therefore, the detection signal outputted by the detection unit includes information relating to variation of the length in the main scanning direction of the detection pattern (data in the main scanning direction). Accordingly, it is possible for the control unit to utilize this detection signal to determine with high resolution, the position of the part of the detection pattern on the downmost stream side in the paper feeding direction, and detect the position of the paper precisely.

According to the paper position detector of the second aspect of the invention, the control unit utilizes the data in the main scanning direction included in the detection signal outputted from the detection unit, together with using the paper feeding speed, the time for the detection unit to detect the detection pattern, and the data as to the shape of the detection pattern, thereby calculating the position of the part of the detection pattern precisely.

BRIEF DESCRIPTION OF DRAWINGS

FIG. 4A illustrates imaging regions and each part of the detection pattern detected in each of the imaging regions at respective detection timings when an image sensor detects the detection pattern of a specific shape (isosceles triangle) formed on the paper, in the image forming apparatus of the embodiment.

FIG. 4B illustrates waveforms of the detection signals outputted from the image sensor respectively in the imaging regions as shown in FIG. 4A.

FIG. 5A illustrates imaging regions and each part of the detection pattern detected in each of the imaging regions at respective detection timings when the image sensor detects the detection pattern of a specific shape (parallelogram) formed on the paper, in the image forming apparatus of the embodiment.

FIG. 5B illustrates waveforms of the detection signals outputted from the image sensor respectively in the imaging regions as shown in FIG. 5A.

FIG. 10A illustrates imaging regions detected at respective detection timings and each part of a detection pattern detected respectively in the imaging regions, when the image sensor detects the detection pattern of a specific shape (inverted isosceles triangle) formed on the paper, in the image forming apparatus of the embodiment.

FIG. 10B illustrates waveforms of the detection signals outputted from the image sensor respectively in the imaging regions as shown in FIG. 10A.

DESCRIPTION OF EMBODIMENTS

Figure 2:
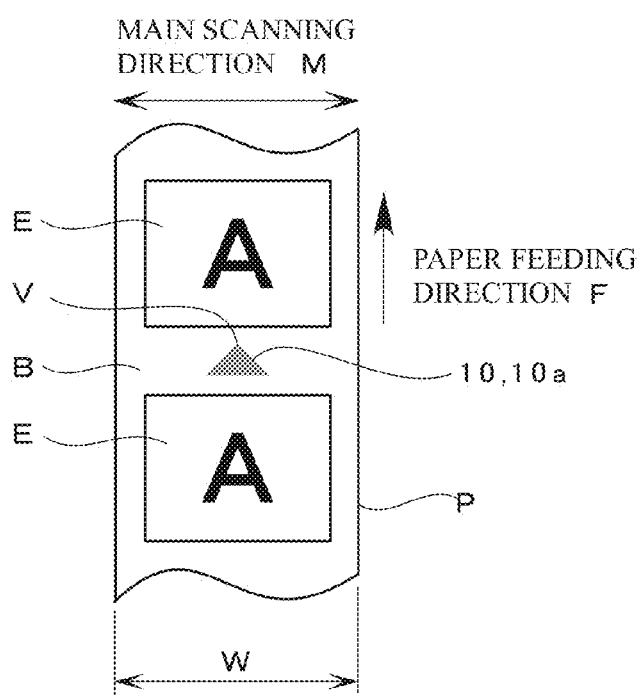
FIG. 2 is a bottom view (figure on the underside) of the paper on which an image and a detection pattern are formed, being carried in a predetermined paper feeding direction in the image forming apparatus of the embodiment.
Figure 3:
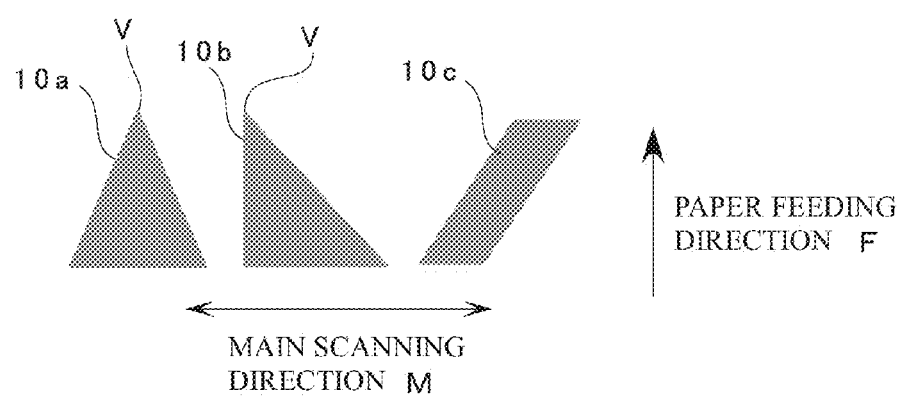
FIG. 3 illustrates shape examples of the detection pattern formed on the paper in the image forming apparatus of the embodiment.

1. Configuration of the Image Forming Apparatus of One Embodiment (FIG. 1 to FIG. 3)

Figure 1:
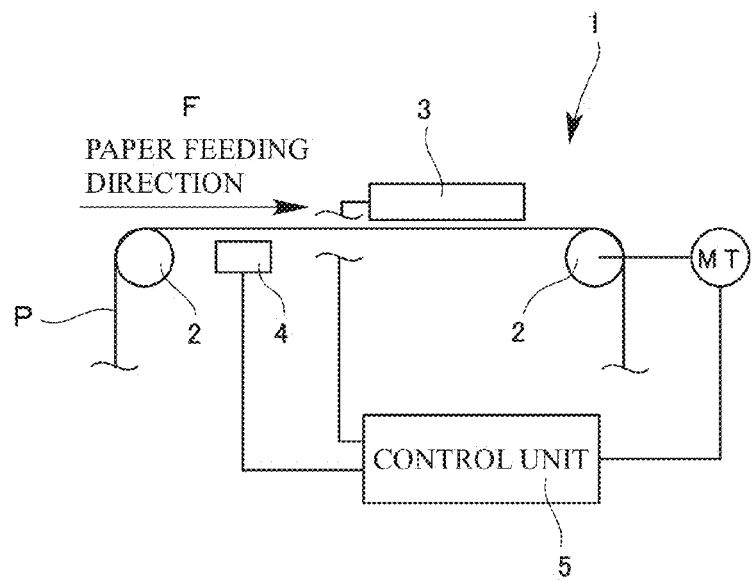
FIG. 1 is a schematic diagram showing a partially omitted configuration of an image forming apparatus provided with a paper position detector in accordance with an embodiment.

The image forming apparatus 1 of the present embodiment as shown in FIG. 1 is a duplex printer that unrolls continuous band-shape paper being rolled, carries the paper, and forms an image on both sides thereof. The image forming apparatus is provided with a paper position detector as a constitutional element, configured to detect precisely a position of the paper P with respect to the paper feeding direction F, and an image forming position is controlled on the basis of the position of the paper P being detected by the paper position detector, thereby achieving precise alignment of the images formed on both the front side and the back side, respectively.

On the under surface of the continuous band-shape paper P obtained by unrolling the roll paper not illustrated in FIG. 1, a first ink jet head as a first image forming unit (the first IJ head), not illustrated, forms a necessary image and simultaneously prints a detection pattern in a predetermined shape to be described later on a portion other than the place where the image is printed.

As shown in FIG. 1, the paper P with the necessary image and the detection pattern being printed on the under surface is carried at a predetermined feeding speed v along a predetermined paper feeding direction F by more than one feeding roller 2 serving as a feeding unit. Some of the feeding rollers 2 serve as drive rollers cooperatively coupled with a motor MT being a drive unit, and other feeding rollers serve as driven rollers.

A second ink jet head 3 (the second IJ head 3) serving as a second image forming unit is arranged facing downward, in such a manner as facing to a top surface of the paper P positioned on the upper part in FIG. 1, allowing any image to be formed on the top surface of the paper being carried.

As shown in FIG. 1, with respect to the paper feeding direction F, an image sensor 4 serving as a detection unit is arranged facing upward, in the upstream side of the second IJ head 3, in such a manner as facing to the under surface of the paper P. The imaging sensor is configured to detect the detection pattern on the under surface of the paper printed by the first IJ head, and output a detection signal for controlling a position where the second IJ head 3 forms an image.

This image sensor 4 has a configuration that a large number of imaging elements, for instance, thousands of imaging elements such as CCDs or CMOS, are arranged along a main scanning direction M, which is parallel to a width direction of the paper and orthogonal to the paper feeding direction F. Then, all the imaging elements are activated at once for the paper P being carried at a predetermined feeding speed v for a predetermined imaging time t, thereby acquiring image information as to an area within a predetermined range of the paper P while it is being carried. It is to be noted that the area of the predetermined range targeted for one-time imaging can be obtained by a product of the length vt of the paper feeding direction F and the width W of the paper (see FIG. 2), and details will be described later.

As illustrated in FIG. 1, the image forming apparatus 1 of the present embodiment is provided with a control unit 5. This control unit 5 is connected to various sensors including at least the first IJ head, the second IJ head 3, and the image sensor 4, the motor MT for the feeding rollers 2, an operation panel, not illustrated, serving as both an input unit and a display unit and the like. The control unit 5 responds to image forming programs and driving data which are stored in advance, image forming commands inputted from the operation panel, and image data inputted from an external PC and the like, and with the use of signals from the various sensors including the image sensor 4, the control unit 5 is able to collectively control each of the units being connected, thereby executing the image formation.

The aforementioned image sensor 4 has a simple configuration that serially outputs image signals transmitted respectively from the large number of imaging elements. Therefore, it is inexpensive and widely employed for detecting a position of paper in the width direction in a conventional image forming apparatus. On the other hand, there is a problem that applying serial processing to the image information is time consuming. In the present embodiment, as described below, the image sensor is applied as a sensor configured to detect a position of the paper P precisely with respect to the paper feeding direction F, according to a particular data processing method, on the basis of a detection signal and the like from the image sensor 4 that has detected a detection pattern in a particular shape and the like. In other words, in the present embodiment, an existing image sensor used for detecting a position of the paper P in the width direction is applied to precise position detection in the paper feeding direction F.

As is known from the aforementioned explanation, the phrases such as the top surface and the under surface of the paper P are just relative expressions. In the present embodiment, the surface on the side where an image is formed earlier is referred to as "under surface", and the surface where an image is formed later is referred to as "top surface". The paper P after the image is formed thereon by the second IJ head 3 is not illustrated in FIG. 1, but it is transported to the downstream side according to driving of the feeding rollers 2, and fed into a paper ejector, a paper post-processor and the like, not illustrated.

FIG. 2 is a bottom view showing the under surface side of the paper P on which the image and the detection pattern are formed and the paper is being carried in the predetermined paper feeding direction F, in the image forming apparatus 1 of the present embodiment. On the under surface of the paper P moving in the paper feeding direction F, the first IJ head forms necessary images A respectively in image forming regions (printing surfaces) which are provided at regular distances. In the marginal region B between the adjacent image forming regions E, the first IJ head forms the detection pattern.

As shown in FIG. 2, in the present embodiment, the detection pattern 10 formed on the paper P includes a graphic shape that has a length in the main scanning direction M being orthogonal to the paper feeding direction F, the length becoming shorter from upstream to downstream along the paper feeding direction F. FIG. 2 illustrates the detection pattern 10a, as an example of such shape as described above, which is a triangle (isosceles triangle) with the base in the upstream side of the paper feeding direction F, and the vertex V is oriented to the downstream side thereof.

FIG. 3 illustrates shape examples of the detection pattern 10 formed on the paper P in the image forming apparatus 1 of the present embodiment, being shown with the paper feeding direction F and the main scanning direction M. The triangle (detection pattern 10a) on the left side of the figure is an isosceles triangle, similarly to the detection pattern as shown in FIG. 2. In addition, the right-angled triangle (detection pattern 10b) as shown in the center of the figure, and the parallelogram (detection pattern 10c) as shown in the right of the figure, may also be available as the detection pattern 10.

In the following, there will be described a method of detecting a position of the paper P precisely with respect to the paper feeding direction F, by detecting the detection pattern 10 in a shape of those examples with the image sensor 4.

2. Detection of Position of the Paper P Using the Detection Pattern 10a of Isosceles Triangle (FIGS. 4A and 4B)

With reference to FIG. 4, there will be described a method of reading the detection pattern 10a of isosceles triangle by the image sensor 4, and detecting a position of the paper P. In the method described below, the control unit 5 performs control of the image sensor 4, operation processing using detection signals obtained from the image sensor 4, and control of each of the units using results of the operation.

As shown in FIG. 4A, the paper P is carried along the paper feeding direction F, at the paper feeding speed v. The image sensor 4 successively takes images of the paper P, the imaging time being t, while the paper is carried at the paper feeding speed v. Consequently, as for the vicinity of the detection pattern 10a as shown in FIG. 4A, for example, each of parts of the detection pattern 10a in the respective imaging regions 1 to 4, each having the length of vt in the paper feeding direction F, is taken by one-time operation.

Then, this allows image information items as to each imaging regions 1 to 4 to be obtained respectively. It is to be noted that FIG. 4A illustrates only the vicinity of the detection pattern 10a.

FIG. 4B illustrates the image information acquired by the image sensor 4, respectively in the imaging regions 1 to 4. In each of the graphs of FIG. 4B, the horizontal axis shows the position of each imaging element (pixel) of the image sensor 4 arranged in the main scanning direction M, and the vertical axis shows outputs from the image sensor 4, represented by analogue values from 0 indicating black to 255 indicating white. As shown in FIG. 4B, the image sensor 4 outputs detection signals in association with the shape of the detection pattern 10a included in the respective imaging regions 1 to 4.

In this example, the detection pattern 10a is in the shape of isosceles triangle, and it is arranged in such a manner that the vertex V is oriented to the downstream side with respect to the paper feeding direction F, and the base is parallel with the main scanning direction M. In order to precisely detect the position of the paper P (or the position of the image) by using the detection pattern 10a in the shape and arrangement as described above, the position of the vertex V of the isosceles triangle is determined. The position of the vertex V can be determined by the length x that is measured along the paper feeding direction F, from the dividing line L1, not intersecting the detection pattern 10a and being the closest to the vertex V, out of the dividing lines L of the respective imaging regions 1 to 4, the dividing lines being determined by the paper feeding speed v and the imaging time t of the imaging sensor 4.

FIG. 4A illustrates the length vt of the imaging region in the paper feeding direction F, and the interval (length) x between the vertex V and the dividing line L1 for determining the position of the detection pattern 10a. Furthermore, the sizes of the portions for specifying the shape of the detection pattern 10a being the isosceles triangle are indicated by characters. In other words, FIG. 4A shows the length y in the main scanning direction M where the isosceles triangle intersects the dividing line L between the imaging regions 2 and 3, the angle θ obtained by dividing the vertex angle of the isosceles triangle into two equal parts (i.e., the angle of the oblique line of the detection pattern 10a, with respect to the paper feeding direction F), and the length z of the bisector of the vertex angle of the isosceles triangle from the vertex to the line segment of the length y (i.e., the length of the perpendicular bisector of the base in the triangle having the base corresponding to the line segment of the length y).

As for the numerical values represented by those characters respectively, the paper feeding speed v, the imaging time t for one-time imaging of the image sensor 4, and the angle θ being half of the vertex angle of the detection pattern 10a are preset values. The length y in the main scanning direction M where the detection pattern 10a intersects the imaging regions 2 and 3 can be found by the output from the image sensor 4 (FIG. 4B(2)). On the basis of those values, the control unit 5 obtains the length x that determines the position of the vertex V of the detection pattern 10a, according to the algorithm as the following.

As is evident from FIG. 4A, the following two formulas are established:

$$x = vt - z \quad \text{(formula 1)}$$

$$z = (y/2)/\tan\theta \quad \text{(formula 2)}$$

When the formula 1 is substituted into the formula 2, $$x = vt - (y/2)/\tan\theta \quad \text{(formula 3)}$$

The control unit 5 obtains x indicating the position of the vertex V of the detection pattern 10a according to the formula 3, and determines a precise position of the paper P with respect to the paper feeding direction F. On the basis of the result thereof, the control unit 5 adjusts the drive timing of the first IJ head, and the second IJ head 3 in the downstream side of the image sensor 4, so as to make the second IJ head 3 form an image at a position on the front side precisely corresponding to the image formed on the back surface of the paper P. Therefore, even when the position of the paper P is displaced with respect to the paper feeding direction F, while the paper is carried from the first IJ head to the second IJ head 3, the displacement is corrected, and it is possible to obtain a print result where the images on the front side and the back side precisely correspond to each other.

According to the present embodiment, such superior performance can be achieved, without newly providing an expensive sensor of high-speed operation separately. In other words, in a conventional image forming apparatus, the image sensor is widely used as a relatively low-speed but inexpensive sensor, aiming at detecting an end of the paper in the width direction, whereas in the present embodiment, this image sensor is used for a purpose other than detecting the end of the paper in the width direction, thereby achieving the new effect, which is practically important, without heavy additional expenses.

3. Paper Position Detection Using the Detection Pattern 10c of Parallelogram (FIG. 5 to FIG. 8)

With reference to FIG. 5 to FIG. 8, there will be described a method of reading the detection pattern 10c of parallelogram by the image sensor 4, and detecting a position of the paper P. In the method described below, the control unit 5 performs control of the image sensor 4, operation processing using detection signals obtained from the image sensor 4, and control of each of the units using results of the operation.

As shown in FIG. 5A, the paper P is carried along the paper feeding direction F, at the paper feeding speed v. The image sensor 4 successively takes images of the paper P, the imaging time being t, while the paper is carried at the paper feeding speed v. Consequently, as for the vicinity of the detection pattern 10c as shown in FIG. 5A, for example, each of parts of the detection pattern 10c in the respective imaging regions 1 to 4, each having the length of vt in the paper feeding direction F, is taken by one-time operation. Then, this allows image information items as to each imaging regions 1 to 4 to be obtained respectively. It is to be noted that FIG. 5A illustrates only the vicinity of the detection pattern 10c. Since the image sensor 4 has a large number of imaging elements arranged in the length across the full width of the paper P in the main scanning direction M that is orthogonal to the paper feeding direction F, only one-time operation allows imaging of an image in the range of the length vt in the paper feeding direction F across the full width of the paper P.

FIG. 5B illustrates the image information acquired by the image sensor 4, respectively in the imaging regions 1 to 4. In each of the graphs of FIG. 5B, the horizontal axis shows the position of each imaging element (pixel) of the image sensor 4 arranged in the main scanning direction M, and the vertical axis shows outputs from the image sensor 4, represented by analogue values from 0 indicating black to 255 indicating white. As shown in FIG. 5B, the image sensor 4 outputs detection signals in association with the shape of the detection pattern 10c, included in the respective imaging regions 1 to 4.

In this example, the detection pattern 10c is in the shape of parallelogram, and it is arranged in such a manner that a pair of opposite sides are parallel to the main scanning direction M (i.e., orthogonal to the paper feeding direction F), and the other pair of opposite sides are inclined with respect to the paper feeding direction F (i.e., also inclined with respect to the main scanning direction M). By using the detection pattern 10c in the shape or the arrangement as described above, the position of the paper P (or the position of the image) is precisely detected. Accordingly, one side is determined, which is in the downstream side with respect to the paper feeding direction F, out of the pair of opposite sides being parallel to the main scanning direction M. The position of this side can be determined by the length x that is measured along the paper feeding direction F, from the dividing line L1, not intersecting the detection pattern 10c and being the closest to the side, out of the dividing lines L of the respective imaging regions 1 to 4, the dividing lines being determined by the paper feeding speed v and the imaging time t of the imaging sensor 4. FIG. 5A illustrates the length vt of each of the imaging regions 1 to 4 in the paper feeding direction F, and the interval (length) x between the upper side and the dividing line L1 for determining the position of the detection pattern 10c.

Figure 6A:
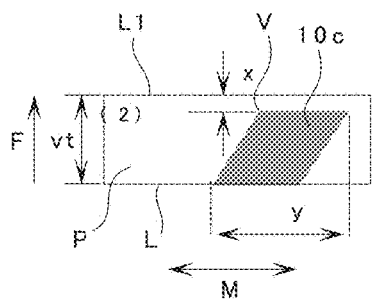
FIG. 6A illustrates an imaging region and a part of the detection pattern detected in the imaging region, at a specific detection timing in detecting the detection pattern of the specific shape (parallelogram) as shown in FIG. 5A.
Figure 6B:
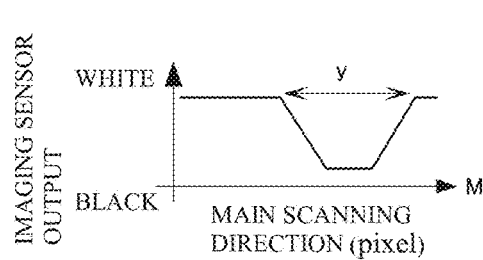
FIG. 6B illustrates a waveform of the detection signals outputted from the image sensor in the imaging region as shown in FIG. 6A.

FIG. 6 illustrates the detection pattern 10c in the imaging region 2 as shown in FIG. 5A, and outputs from the image sensor 4 in association with the detection pattern 10c in the imaging region 2 as shown in FIG. 5B. Within this imaging region 2, a maximum length of the detection pattern 10c passing through the main scanning direction M, that is, the maximum range of the imaging elements for detecting the detection pattern 10c corresponds to y as shown in FIG. 6. As shown in FIG. 6B, this length y corresponds to the length (measured value) obtained from the outputs of the image sensor 4.

Figure 7A:
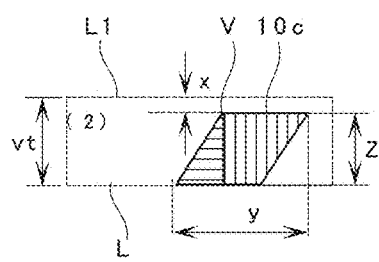
FIG. 7A illustrates a part of the detection pattern detected in the imaging region at the specific timing as shown in FIG. 6A.
Figure 7B:
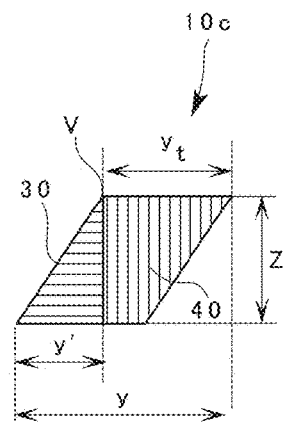
FIG. 7B is an enlarged view of the detection pattern as shown in FIG. 7A, illustrating the detection pattern is divided into two areas for the convenience of calculating a specific position of the detection pattern.

FIGS. 7A and 7B are first diagrams for describing an algorithm to analyze the image of the detection pattern 10c detected in the imaging region 2 as shown in FIG. 6, and obtain an end of the detection pattern 10c. FIG. 7A is associated with FIG. 6A, and FIG. 7B illustrates the pattern taken out from FIG. 7A in an enlarged manner. As shown in FIGS. 7A and 7B, the detection pattern 10c detected in the imaging region 2 will be discussed, breaking it down into a right-angled triangle 30 as shown by horizontal stripes, and a quadrilateral 40 as shown by vertical stripes, the size of each portion being represented by the symbols as shown in FIG. 7B. In other words, the length of the base of the right-angled triangle 30 shown by horizontal stripes is represented as y', and the length of the upper base of the quadrilateral 40 is represented as $y_t$. Here, $y_t$ corresponds to the side length (known) of the quadrilateral 40 of the detection pattern 10c. The length y is a length (measured value) obtained from the outputs of the image sensor 4 as described above.

It is to be noted that, for the sake of convenience, the height of the right-angled triangle 30 or the quadrilateral 40 is assumed as z with respect to the paper feeding direction F.

A relationship among the lengths y', y (measured value), and $y_t$ (known) as shown in FIG. 7B is expressed in the following formula:

$$y'=y-y_t \qquad \text{(formula 4)}$$

Figure 8:
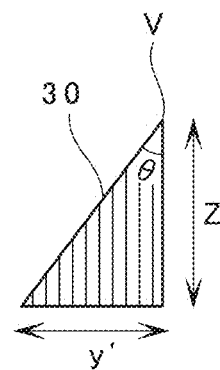
FIG. 8 illustrates a graphic pattern included in the detection pattern and a method of calculating a specific position, for the convenience of calculating the specific position in the detection pattern detected in the imaging region at the specific timing as shown in FIG. 7A and FIG. 7B.

FIG. 8 is a second diagram for describing the algorithm to obtain the tip of the detection pattern 10, focusing on the right-angled triangle 30 as shown in FIG. 7. Here, the tip of the detection pattern 10c represents the tip of the pattern with respect to the paper feeding direction F, and it corresponds to V indicating the vertex of the right-angled triangle 30. This vertex V exists on the side in the downstream with respect to the paper feeding direction F, out of the pair of sides of the quadrilateral 40 parallel to the main scanning direction M. Therefore, as shown in FIGS. 6A, 6B, 7A and 7B, the vertex V of the right-angled triangle 30, being the tip of the detection pattern 10c, is determined by the length x which corresponds to an interval between the detection pattern 10c and the dividing line L1 not intersecting the detection pattern 10c and at the position being the closest to the vertex V, out of the dividing lines L of the imaging region 2.

The paper feeding speed v, the imaging time t for one-time imaging by the image sensor 4, and the vertex angle θ of the right-angled triangle 30 (i.e., the angle made by the oblique side of the right-angled triangle 30 with respect to the paper feeding direction F) as shown in FIG. 8, are already known. In addition, the length y' of the base of the right-angled triangle 30 can be calculated, using the values y (the detected value by the image sensor 4) and $y_t$ (known) according to the formula 4. On the basis of those values, the control unit 5 obtains the length x that determines the vertex V of the triangle included in the detection pattern 10c, according to the following algorithm.

As obvious from FIGS. 7A, 7B and 8, the following two formulas are established:

$$x=vt-z \qquad \text{(formula 5)}$$

$$z=y'/\tan\theta \qquad \text{(formula 6)}$$

When the formula 5 is substituted into the formula 6, $$x=vt-y'/\tan\theta \qquad \text{(formula 7)}$$

The control unit 5 obtains the position x of the vertex V of the right-angled triangle 30 included in the detection pattern 10c according to the formula 7, and determines the precise position of the paper P with respect to the paper feeding direction F. Consequently, a superior effect can be achieved, similarly to the case where the detection pattern 10a as the isosceles triangle is used.

4. Detection of the Paper Position Using the Detection Pattern 10 of Other Shape (FIGS. 9A to 9C and FIGS. 10A and 10B)

In the present embodiment, triangle-shaped detection patterns 10a and 10b with the tip oriented to the downstream, or a parallelogram-shaped detection pattern 10c in a predetermined arrangement with respect to the paper feeding direction F are usable as the detection pattern 10. However, the shape of the detection pattern 10, the arrangement thereof and the like are not limited to those examples.

Figure 9A:
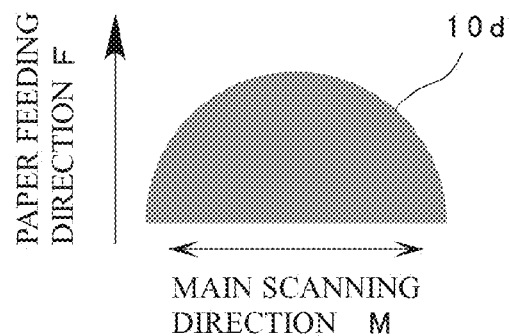
FIGS. 9A and 9B illustrate other shape examples of the detection pattern formed on the paper in the image forming apparatus of the embodiment.
Figure 9B:
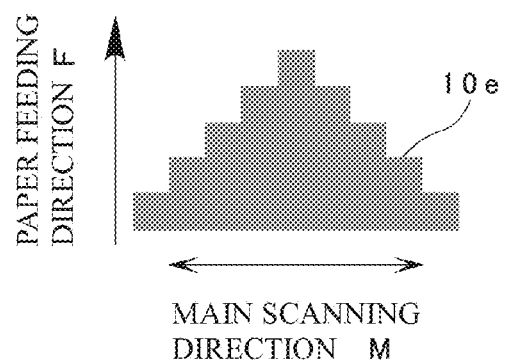

By way of example, following patterns may also be effective as the detection pattern 10 to be formed on the paper P in the present embodiment: as shown in FIG. 9A, the detection pattern 10d in the shape of semicircle with the diameter orthogonal to the paper feeding direction F (i.e., being parallel to the main scanning direction M); and as shown in FIG. 9B, the detection pattern 10e in a symmetrical shape with respect to a center line parallel to the paper feeding direction F, the shape being like a stepped pyramid with a width of the main scanning direction M that becomes smaller toward the downstream side of the paper feeding direction F. In other words, the detection pattern 10 applicable in the present embodiment, like the detection pattern 10a in the shape of isosceles triangle, may be in the shape and arrangement in which the length in the main scanning direction M orthogonal to the paper feeding direction F becomes shorter from upstream to downstream along the paper feeding direction F, or the detection pattern may include a graphic shape in the shape and arrangement such as the right-angled triangle 30, like the detection pattern 10c in the shape of the parallelogram. Accordingly, the detection patterns 10 described so far are just examples and a pattern in any different shape and arrangement within the range adapted to the aforementioned descriptions are intended to be included in the scope of the present invention. For example, the detection pattern may be a trapezoid with a short upper base and a long lower base parallel to the main scanning direction M, and the upper base is positioned in the downstream side of the paper feeding direction F.

However, it is to be noted that shapes and arrangement patterns not adapted to the descriptions above are out of the scope of the present invention. For example, as shown in FIG. 9C, even though the pattern is in the shape of isosceles triangle, if it is shaped and arranged in such a manner that the base parallel to the main scanning direction M is positioned in the downstream side of the paper feeding direction F and the vertex V is positioned in the upstream side (this pattern is referred to as an inverted isosceles triangle 50), it is not possible to achieve the object of the present invention.

Figure 9C:
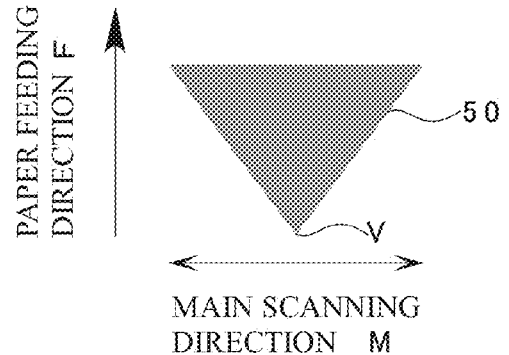
FIG. 9C illustrates a shape example that fails to function as the detection pattern for detecting the position of the paper, even formed on the paper in the image forming apparatus of the embodiment.
Figure 10A:
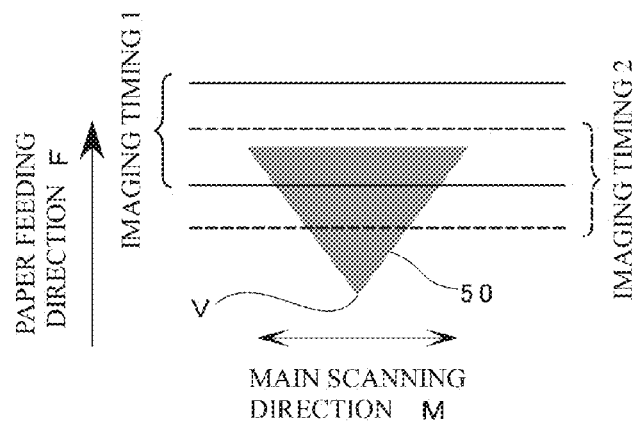
FIGS. 10A and 10B illustrate reasons why the detection pattern as shown in FIG. 9C is not usable for detecting the paper in the present embodiment.
Figure 10B:
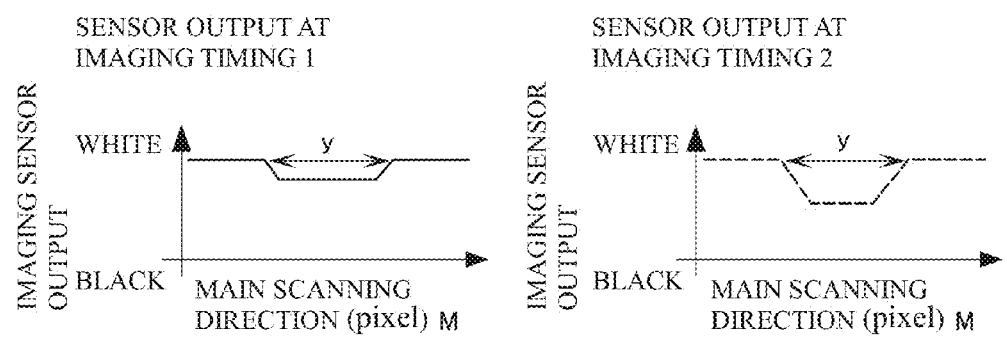

FIG. 10 illustrates why it is not possible to detect a specific position of the detection pattern with reliability if the detection pattern in the shape of the inverted isosceles triangle 50 as shown in FIG. 9C is used. FIG. 10A illustrates each part of the detection pattern detected in each of the imaging regions at different imaging timings 1 and 2, when the image sensor 4 detects the detection pattern in the shape of inverted isosceles triangle 50 formed on the paper P, and FIG. 10B illustrates waveforms of the detection signals outputted from the image sensor 4 in each of the imaging regions as shown in FIG. 10A.

If the detection pattern in the shape of the inverted isosceles triangle 50 as shown in FIG. 9C or FIG. 10A is used, it is not possible to detect the position of the paper P precisely. This is because, as shown in FIG. 10A, there is a possibility that the number of imaging elements (pixels) for detecting the inverted isosceles triangle 50 in the main scanning direction M becomes the same between the different imaging timings 1 and 2. In other words, if the imaging timing 1 is compared with the imaging timing 2, when the number of pixels (y) in the main scanning direction M is measured according to the method of the present embodiment, an equal value may be obtained at both the imaging timing 1 and the imaging timing 2. In the present embodiment, when the number of the imaging elements (pixels) is the same in the main scanning direction M, it is determined that the imaging is performed at the same timing. Therefore, it is not possible to make distinction between the imaging timing 1 and the imaging timing 2, resulting in erroneous detection of both images taken at the same time. Consequently, the detection pattern in the shape of the inverted isosceles triangle 50 should be inappropriate for the present invention.

In the embodiment as described above, an example where the paper position detector of the present invention having the image sensor 4 and the control unit 5 is installed in the image forming apparatus 1 that uses roll paper for printing. The present invention is also applicable to an image forming apparatus that uses cut-sheet paper instead of the roll paper.

In addition, the paper position detector of the present invention is not necessarily applied only to the image forming apparatus, but also widely available for the purpose of precisely detecting a position of the paper in the paper feeding direction in a generally-used paper feeding apparatus.

The paper position detector of the present invention employs a sensor like an image sensor not intended to precisely detect a position of the paper being carried with respect to the feeding direction, but it is capable of precisely determining a position of the paper P in the feeding direction, by using a particular detection pattern 10 and a particular operation algorithm. A line camera, a CCD scanner and the like may also be applicable to the sensor as a low-price image sensor not having a high degree of detection precision in the feeding direction, and those sensors may also produce equivalent effect.

It is to be noted that the title of the present invention is the paper position detector, but from a viewpoint of detecting a specific position of the detection pattern formed on paper, the title of "image position detector" or "pattern detector" may embrace the same technical idea.

The following are the reference signs in the FIGURES:
1: image forming apparatus
3: second ink jet head as image forming apparatus (second IJ head)
4: image sensor serving as detection unit
5: control unit
10, 10a, 10b, 10c, 10d, 10e: detection pattern
30: right-angled triangle included in detection pattern
F: paper feeding direction
P: paper
M: main scanning direction
L: dividing line of imaging region
1 to 4: imaging region

The invention claimed is:

1. A paper position detector configured to detect a position of paper being carried along a predetermined paper feeding direction, comprising:

a detection unit configured to detect, on the paper, a detection pattern including a graphic shape having a length in a main scanning direction orthogonal to the paper feeding direction, the length becoming shorter from an upstream side to a downstream side along the paper feeding direction, and output a detection signal including at least data in the main scanning direction; and a control unit configured to use at least the detection signal related to the detection pattern outputted from the detection unit and calculate a position of a part of the detection pattern on a downmost stream side in the paper feeding direction from the detection signal, wherein the control unit calculates the position of the part of the detection pattern located at the downstream side in the paper feeding direction, by using:

the data in the main scanning direction included in the detection signal outputted from the detection unit;

a predetermined paper feeding speed;

a predetermined time taken for the detection unit to detect the detection pattern; and a predetermined data as to a shape of the detection pattern, the position of the part of the detection pattern is defined as x, the data in the main scanning direction is defined as y or y', the predetermined paper feeding speed is defined as v, the predetermined time is defined as t, and the predetermined data is defined as θ, and the graphic shape in the detection pattern includes a triangle having a base at the upstream side and a vertex at the downstream side in the paper feeding direction or a single figure substantially same as the triangle, and the control unit calculates the x indicating the position of the part of the detection pattern based on an algorithm, the algorithm being provided as $x=vt-(y/2)/\tan\theta$ or $x=vt-y'/\tan\theta$.

* * * * *